US010837204B2

(12) United States Patent
Hambusch et al.

(10) Patent No.: US 10,837,204 B2
(45) Date of Patent: Nov. 17, 2020

(54) CLOSURE BRACKET ASSEMBLY FOR SELECTIVELY RETAINING OR ROTATIONALLY RELEASING AN ENGINE HOOD OF A MOTOR VEHICLE

(71) Applicant: Bayerische Motoren Werke Aktiengesellschaft, Munich (DE)

(72) Inventors: Thorsten Hambusch, Landshut (DE); Norman Dix, Ingolstadt (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 372 days.

(21) Appl. No.: 15/794,158

(22) Filed: Oct. 26, 2017

(65) Prior Publication Data

US 2018/0044954 A1 Feb. 15, 2018

Related U.S. Application Data

(63) Continuation of application No. PCT/EP2016/059599, filed on Apr. 29, 2016.

(30) Foreign Application Priority Data

May 6, 2015 (DE) .................. 10 2015 208 392

(51) Int. Cl.
*E05B 83/24* (2014.01)
*B60R 21/38* (2011.01)
(Continued)

(52) U.S. Cl.
CPC .............. *E05B 83/24* (2013.01); *B60R 21/38* (2013.01); *E05B 77/08* (2013.01); *E05B 85/045* (2013.01)

(58) Field of Classification Search
CPC ........ E05B 83/16; E05B 83/24; E05B 83/243; E05B 83/247; E05B 77/00; E05B 77/08;
(Continued)

(56) References Cited

U.S. PATENT DOCUMENTS

| 2004/0113459 A1* | 6/2004 | Mattsson ................ B60R 21/38 296/187.04 |
| 2009/0152899 A1* | 6/2009 | Scheuch ................. B60R 21/38 296/193.11 |
| 2009/0288271 A1* | 11/2009 | Kmieciak ............... B60R 21/38 16/308 |

FOREIGN PATENT DOCUMENTS

| DE | 101 11 146 A1 | 3/2002 |
| DE | 10 152 621 A1 | 5/2003 |

(Continued)

OTHER PUBLICATIONS

International Search Report (PCT/ISA/210) issued in PCT Application No. PCT/EP2016/059599 dated Jul. 22, 2016 with English translation (Six (6) pages).

(Continued)

*Primary Examiner* — Nathan Cumar
(74) *Attorney, Agent, or Firm* — Crowell & Moring LLP

(57) ABSTRACT

In order to improve the release movement of a closure bracket assembly for retaining or raising a pivotable front flap of a motor vehicle from a normal position into a protection position, a closure bracket having a closure bolt and a closure bracket upper part is provided. The closure bolt is secured in a lock in the normal position and in the protection position. A front flap securing device can be secured on the front flap. A pivot shaft is arranged on the front flap securing device and about which the front flap securing device is pivotally mounted for raising purposes. A closure bracket holder is provided on which the closure bracket is held. The pivot shaft is arranged on the closure bracket holder and the closure bolt can be pivoted in the lock during raising.

15 Claims, 6 Drawing Sheets

(51) Int. Cl.
*E05B 77/08* (2014.01)
*E05B 85/04* (2014.01)

(58) Field of Classification Search
CPC .......... E05B 77/04; E05B 77/06; E05B 77/12;
E05B 85/045; B60R 21/38; B60R 21/34;
B60R 19/02; B60R 2021/343; B60R 2021/346
USPC .......................................................... 292/95
See application file for complete search history.

(56) References Cited

FOREIGN PATENT DOCUMENTS

| | | |
|---|---|---|
| DE | 10 2006 052 189 A1 | 5/2008 |
| DE | 10 2008 056 407 A1 | 6/2010 |
| DE | 10 2013 202 207 A1 | 8/2014 |
| DE | 10 2013 003 956 A1 | 9/2014 |
| EP | 1 361 121 A1 | 11/2003 |
| EP | 2 902 272 A1 | 8/2015 |
| FR | 2 969 076 A1 | 6/2012 |
| WO | WO 03/095273 A1 | 11/2003 |

OTHER PUBLICATIONS

German-language Written Opinion (PCT/ISA/237) issued in PCT Application No. PCT/EP2016/059599 dated Jul. 22, 2016 (Five (5) pages).
German-language Search Report issued in counterpart German Application No. 10 2015 208 392.6 dated Feb. 23, 2016 with partial English translation (Thirteen (13) pages).

* cited by examiner

CLOSURE BRACKET ASSEMBLY FOR SELECTIVELY RETAINING OR ROTATIONALLY RELEASING AN ENGINE HOOD OF A MOTOR VEHICLE

CROSS REFERENCE TO RELATED APPLICATIONS

This application is a continuation of PCT International Application No. PCT/EP2016/059599, filed Apr. 29, 2016, which claims priority under 35 U.S.C. § 119 from German Patent Application No. 10 2015 208 392.6, filed May 6, 2015, the entire disclosures of which are herein expressly incorporated by reference.

BACKGROUND AND SUMMARY OF THE INVENTION

The present invention concerns a closure bracket assembly for retaining or rotationally releasing a pivoting engine hood of a motor vehicle from a normal position to a protective position with a closure bracket interacting in a lock. Furthermore, the present invention concerns a motor vehicle outfitted with this closure bracket assembly.

With the closure bracket assembly of this kind, the function of a pedestrian collision protection should be realized, wherein if a pedestrian or bicycle rider collides with the corresponding motor vehicle the engine hood is removed by a certain distance from the car body. At the same time, this increases the distance of the engine hood from a generally rigid component located underneath, such as a drive assembly, by which the risk of injury to the pedestrian or bicycle rider can be decreased.

The active systems for collision protection which serve this purpose, in which after a sensor-controlled recognition of a possible front impact with a pedestrian or bicycle rider the engine hood is raised actively by way of an actuator, have been generally known for a long time.

Thus, there is known from DE 101 52 621 A1 an arrangement of an engine hood on a motor vehicle with at least one hinge device at the rear—looking in the main driving direction—and at least one lock in front for retaining or raising the engine hood from a normal position to a protective position. A raising of the engine hood in its rear area is done by activation of an actuator acting on the rear end of the engine hood. A raising of the engine hood in its front region is accomplished by a forced coupling means, especially a sliding guide, which carries along the front region of the engine hood when it is raised in its rear area. Furthermore, a further actuator may optionally be provided at the front of the engine hood to support the forced movement of the engine hood in event of a collision.

Likewise in known manner, the engine hood is mounted as a body component able to pivot by way of a hinge on a vehicle body and to be secured there in the closed position by a closing bracket assembly and a corresponding lock. During the normal operation of the corresponding vehicle, the engine hood is held stationary on the corresponding body. But in order for the rigid or stationary engine hood to be capable of being actively raised, as mentioned, it is necessary to introduce a certain degree of freedom in event of the collision protection function.

For this purpose, there is provided in DE 10 2013 003 956 A1 a closure bracket assembly for retaining or raising a pivoting engine hood of a motor vehicle from a normal position into a protection position with a lever mechanism. The lever mechanism on the one hand is pivotably mounted on an engine hood fastening part, on which the engine hood is secured by way of a pivot shaft. On the other hand, the lever mechanism is mounted in translation as well as in rotation about another pivot shaft. The sliding guide itself is provided on a closure bracket holder, on which is arranged the closure bracket, consisting of a closure bracket upper part and a closure bolt. The closure bracket is secured in a lock and remains there in its position even in event of a collision. On the other hand, during a collision the engine hood fastening part at first performs a translatory movement in the sliding guide, and then a rotational movement on the one hand about the pivot shaft provided on the engine hood fastening part and on the other hand about the pivot shaft provided in the sliding guide. On the whole, therefore, the raising movement of the engine hood at the lock side in the closure bracket assembly known from DE 10 2013 003 956 A1 occurs at first as a translatory movement, which transitions into a rotational movement. The layout of the closure bracket assembly provided for this is comparatively complicated and disadvantageously requires a comparatively large installation space.

The problem which the present invention proposes to solve is to create a closure bracket assembly for an engine hood which overcomes the aforementioned drawbacks.

This problem is solved by a closure bracket assembly according to embodiments of the invention, whereby now only a single pivot shaft arranged on the closure bracket holder and a closure bolt rotationally mounted in the lock are provided. It is apparent that the abandoning of both a sliding guide and a pivot shaft arranged in the sliding guide, as provided in the prior art, advantageously brings with it a reduced number of components.

In order to prevent an unintentional raising of the engine hood, it is provided according to the invention that a first antirotation device cooperating with a first release device is arranged on the engine hood fastening device, which secures the engine hood fastening device in the normal position and releases it to assume the protective position.

An especially simple technical design of the closure bracket assembly according to the invention is achieved when the first releasing device and the first antirotation device are joined together releasably by way of force locking, form fit and/or frictional locking.

This is especially so when the first releasing device is a blocking pawl which in the normal position lies against the first antirotation device, designed as a spring.

According to the invention, it may likewise be provided that a second antirotation device, cooperating with a second releasing device, is arranged on the engine hood fastening device, which secures the engine hood fastening device in the normal position and releases it to assume the protective position. This further improves the reliability of the device according to the invention against an unintentional raising of the engine hood.

An especially simple technical embodiment in regard to the previously mentioned aspect of the closure bracket assembly according to the invention is achieved when the second releasing device and the second antirotation device are joined together releasably by means of force locking, form fit and/or frictional locking.

This is especially so when the second releasing device is a spring which in the normal position engages the second antirotation device, designed as a groove.

It may be provided that the first releasing device and/or the second releasing device is (are) activatable by an actuator. In this way, it is easily possible to create an active engine hood which further improves the safety of others on the road.

When the closure bracket holder is substantially congruent with the engine hood fastening device and/or is arranged in the latter in the normal position, especially little structural space is required advantageously for the device according to the invention.

Advantageously, the closure bracket may have at least one adjustment device, thanks to which the alignment of an engine hood equipped with the closure bracket assembly according to the invention on a vehicle body can be done with few and simple means, whether during the fabrication of a motor vehicle or during an inspection or repair of same.

The aforementioned problem is likewise solved by a motor vehicle with an engine hood which can be raised from a normal position into a protective position by means of a rear hinge mechanism—looking in the main driving direction—and at least one front lock, wherein a closure bracket assembly of the above presented kind according to the invention is provided.

The above described features of the present invention may be combined with each other to the extent possible, even if not explicitly described in the above.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, nonprejudicial, and especially nonlimiting description of a sample embodiment of the present invention is presented below with reference to FIGS. 1 to 4D. The same elements are provided with identical reference numbers, unless otherwise indicated.

Figure 1:
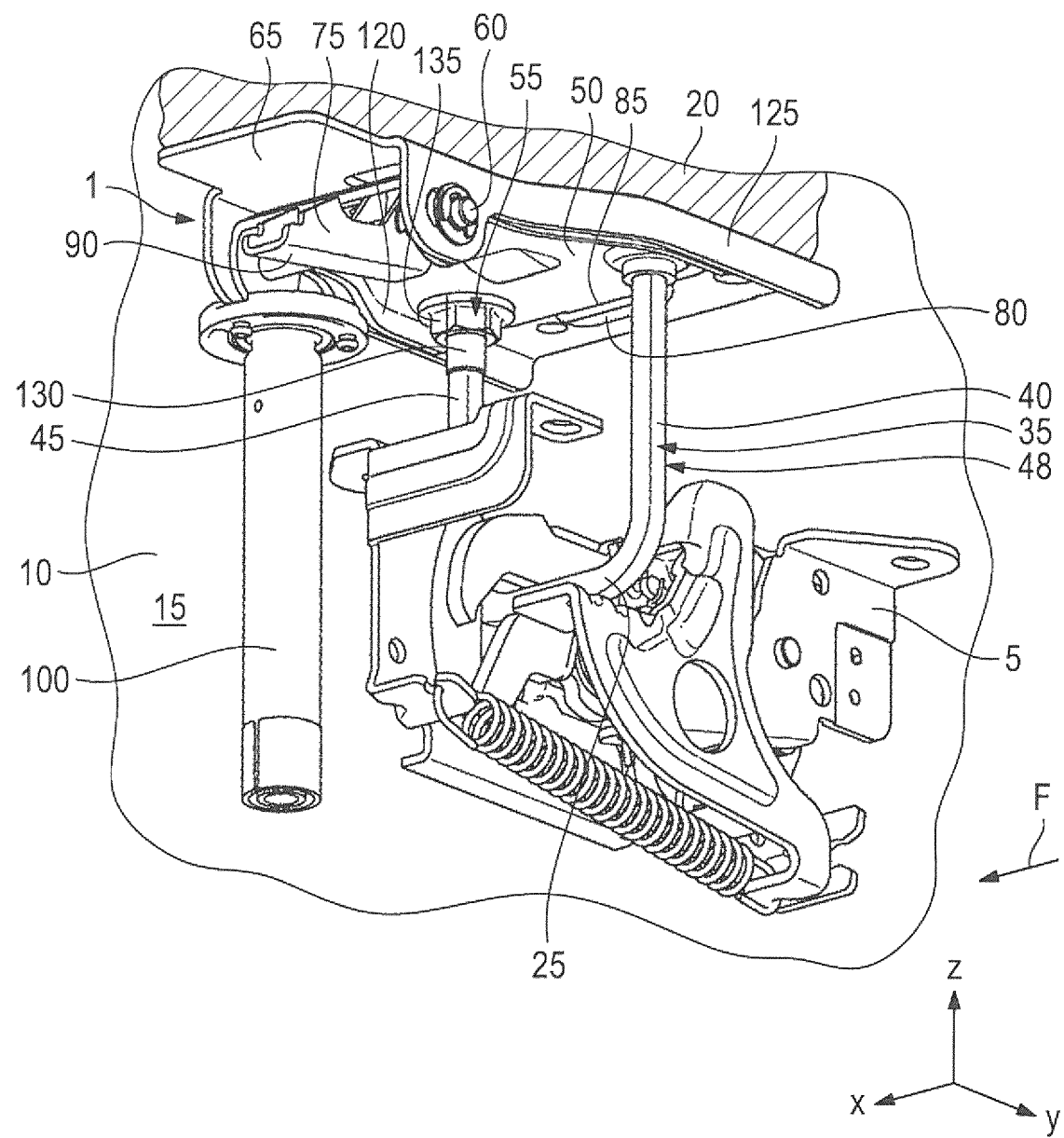
FIG. 1 is a perspective side view diagonally from the bottom of a closure bracket assembly according to an embodiment of the invention in the normal position.

FIG. 1 shows a closure bracket assembly 1 in perspective side view, diagonally from below, in the normal position. The closure bracket assembly 1 is held in a lock 5 which is known from the prior art, which is secured by fasteners not shown here, preferably screws, to the body 10 of a motor vehicle 15. The right part of the body 10 shown in FIG. 1 represents the front region of the motor vehicle 15 facing in the main driving direction F, as can be seen from the x-axis of the vehicle-bound Cartesian coordinate system normally used and shown in the figure. In event of a collision as recognized by a sensor, not shown, an engine hood 20 of the motor vehicle 15 is raised according to the invention contrary to the x-direction (and therefore contrary to the main driving direction F, i.e., to the right in FIG. 1) and in the z-direction or the upward direction (i.e., upward in FIG. 1).

The closure bracket assembly 1 has a closure bolt 25, which extends in the vehicle transverse direction y and is secured in the lock 5 in a known manner in the x and z-direction; a rotation about its longitudinal axis (i.e., about y) remains possible here. The securing is basically permanent and is only released when the engine hood 20 is raised for a normal opening process, for example, to perform maintenance or inspection work on units located beneath the engine hood 20 (not shown here).

On the closure bolt 25 there is integrated a substantially flat closing bracket upper part 35, having two brackets 40, 45 protruding toward the engine hood 20 in the sample embodiment shown here. The closure bolt 25 and the closure bracket upper part 35 together form a closure bracket 48. The bracket 40 is secured to a closure bracket holder 50. The bracket 45 has an adjustment device 55, whose construction and function will be described in regard to FIG. 3.

At its end opposite the two brackets 40, 45, a pivot shaft 60 is mounted on the closure bracket holder 50, allowing it a rotational motion. Furthermore, an engine hood fastening device 65 is pivotably mounted on the pivot shaft 60, so that the engine hood fastening device 65 and the closure bracket holder 50 can turn toward each other in event of a collision of the motor vehicle 15 with a pedestrian or bicycle rider (not shown).

In order to prevent an unwanted rotary movement of the closure bracket holder 50 and the engine hood fastening device 65, a first antirotation device 70 interacting with a first releasing device 75 and a second antirotation device 80 interacting with a second releasing device 85 are provided.

Figure 2:
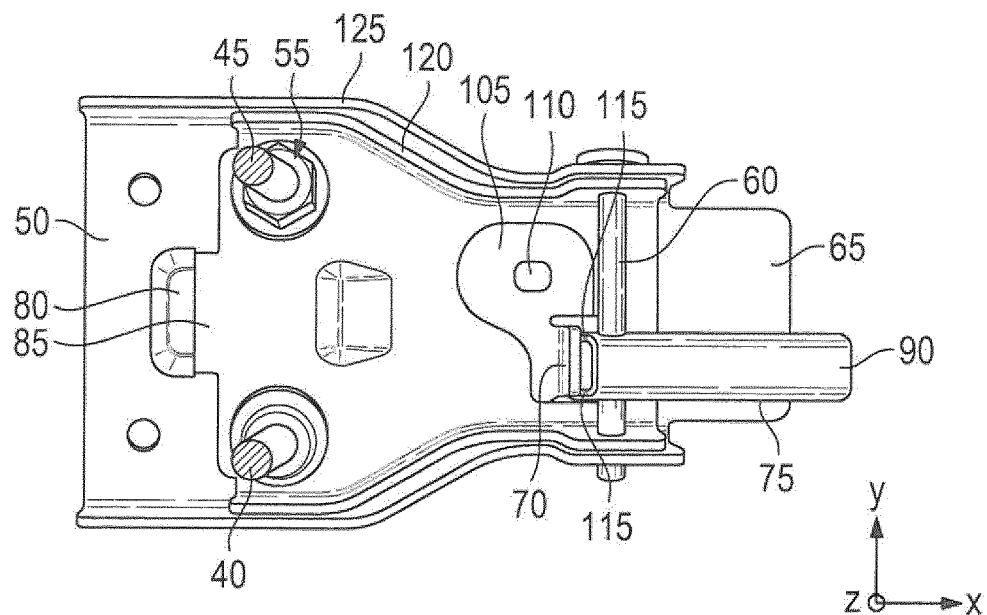
FIG. 2 represents part of the closure bracket assembly in its normal position, in a bottom view.

As can be seen from FIGS. 1 and 2, the first releasing device 75 is designed as a lever, which is mounted by one end to pivot on the pivot shaft 60. Its opposite end has a bearing surface 90, against which a ram 95 of an actuator 100 (cf. FIG. 4A) can engage. The end of the first releasing device 75 next to the pivot shaft 60 engages against the first antirotation device 70, which in this sample embodiment basically protrudes as a lug from the engine hood fastening device 65 toward the first releasing device 75. The space required for this is created by a recess 105 provided in the closure bracket holder 50.

The first releasing device 75 and the first antirotation device 70 in the sample embodiment shown here are biased against each other such that a relative motion between the closure bracket holder 50 and the engine hood fastening device 65 is precluded. Only by releasing this connection of the first releasing device 75 and first antirotation device 70 thanks to the actuator 100 can the above-described relative motion occur.

The connection of the first releasing device 75 and first antirotation device 70 may be by force locking, form fit, and/or friction locking. Thus, the first releasing device 75 may be created in particular from spring steel, which interacts in resilient manner—due to the material—with the first antirotation device 70. Alternatively or in addition to this, the first releasing device 75 may have at least one, or as shown in FIG. 2 two shoulders 115, which in the normal position of the engine hood 20 lie against the first antirotation device 70 and thereby protect it against unintentional raising.

It should be noted that the shape and size of the recess 105 furthermore allow a holding of a fastener (such as a screw, not shown here), which extends through an opening 110 provided in the engine hood fastener 65, so that the latter and the engine hood 20 can be fastened to each other.

As can also be seen from FIG. 2, at the end of the closure bracket holder 50 opposite the pivot shaft 60 with first releasing device 75 and first antirotation device 70, there is a second antirotation device 80, which interacts with a second releasing device 85 located on the engine hood fastening device 65. Specifically, the second releasing device 85 is designed as a lug or a spring which engages in the second antirotation device 80, configured as a groove. The engaging itself is of relatively small dimension, such as 1 mm, so that the second releasing device 85 and the second antirotation device 80 after a releasing movement of the first releasing device 75 and first antirotation device 70 can separate from each other substantially rotationally, without needing a translatory motion of closing bracket holder 50 and engine hood fastening device 65. The second antirotation device 80 and the second releasing device 75 may also be joined together by force locking, form fit, and/or friction locking; accordingly, what was said above about the first releasing device 75 and the first antirotation device 70 applies here.

In this exemplary embodiment, the first antirotation device 70 is biased by the first releasing device 75 (in FIG. 2, to the left or against the main driving direction of the motor vehicle 15). Since the first antirotation device 70 and the second releasing device 85 are located on the engine hood fastening device 65, the second antirotation device 85 in the normal position is pressed against the second releasing device 85 and likewise held in position.

As FIG. 2 clearly shows, the engine hood fastening device 65 and the closure bracket holder 50 are substantially congruent in the x-z plane, so that the closure bracket holder 50 in the normal position is received in the engine hood fastening device 65. In this way, the structural space required for the device according to the invention is advantageously decreased. This is especially so because both the closure bracket holder 50 and the engine hood fastening device 65 are substantially flat and each has a stiffening bevel.

Figure 3:
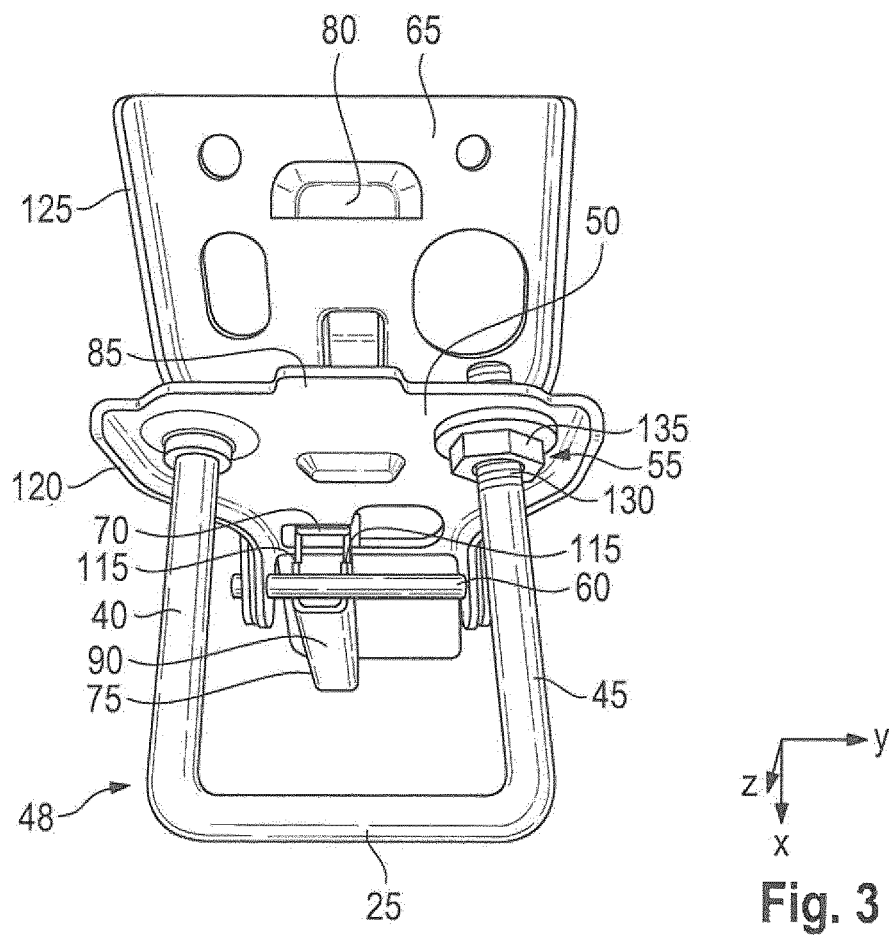
FIG. 3 represents part of the closure bracket assembly in the protective position, diagonally from the bottom and to the front.

In FIG. 3, the part of the closure bracket assembly 1 shown in FIG. 2 is represented in the protective position diagonally from below. The first releasing device 75 is released from the first antirotation device 70. The second releasing device 85 is also no longer in the second antirotation device 80, so that the engine hood fastening device 65 can take up an inclined position relative to the closure bracket holder 50 about the pivot shaft 60.

As mentioned above, there is an adjustment device 55 on the bracket 45 of the closure bracket upper part 35. The adjustment device 55 consists in this sample embodiment of a thread 130 extending through the closure bracket holder 50 and supported by it, which is adjustable by means of a screw 135 in the z-direction or height direction. By this simple means, the position or orientation of the closure bracket assembly 1 in the installed state can be adapted in order to balance out any tolerances between car body 10 and engine hood 20.

Starting with the closure bracket assembly 1 shown in the normal position in FIG. 1, the taking up of the protective position shall now be shown in FIG. 4A to 4D at discrete moments of time after determining a collision.

Figure 4A:
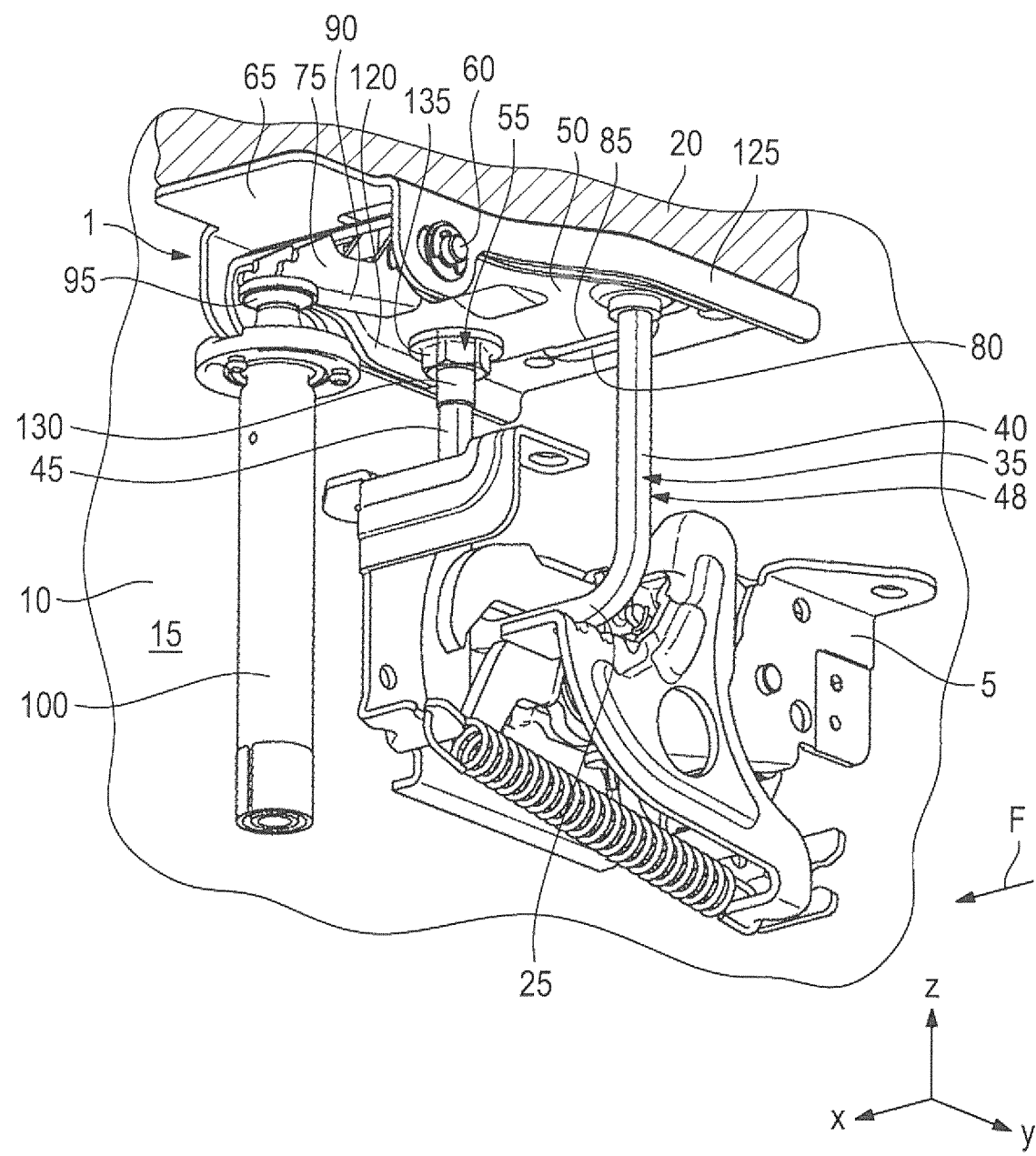
FIG. 4A to 4D represent the raising movement of the closure bracket assembly from the normal position to the protective position at selected moments of time.

In FIG. 4A, the ram 95 of the actuator 100 is extended far enough to lie against the bearing surface 90 of the first releasing device 75. In this state, the closure bracket holder 50, the engine hood fastening device 65 and the closure bolt 25 are in their starting position. The closure bracket upper part 35 is oriented substantially vertically in the z-direction and held by means of the closure bolt 25 located in the lock 5. Thus, except for the ram 95, all the elements of the closure bracket assembly 1 are in their normal position, as is the engine hood 20.

Figure 4B:
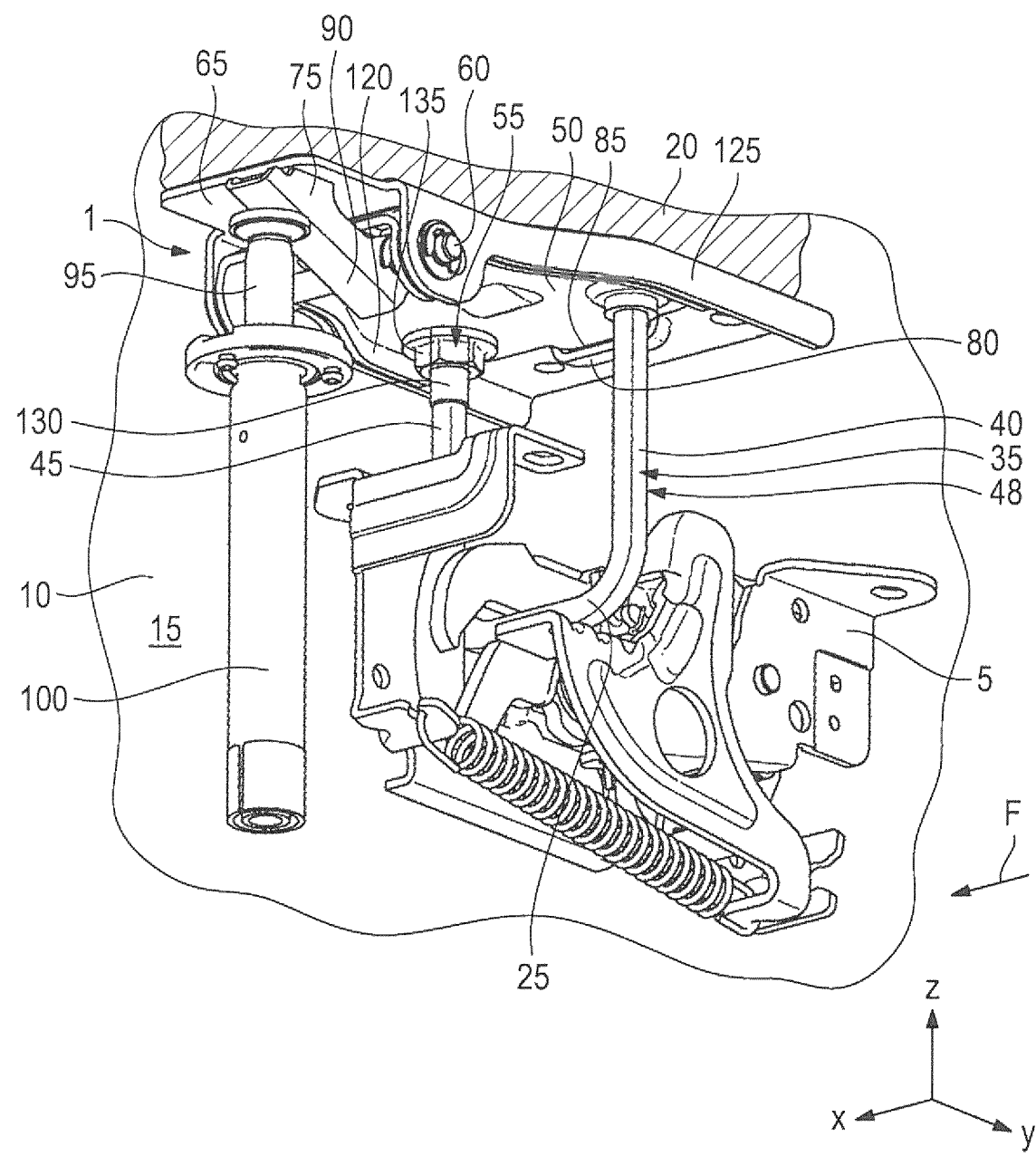
Figure 4C:
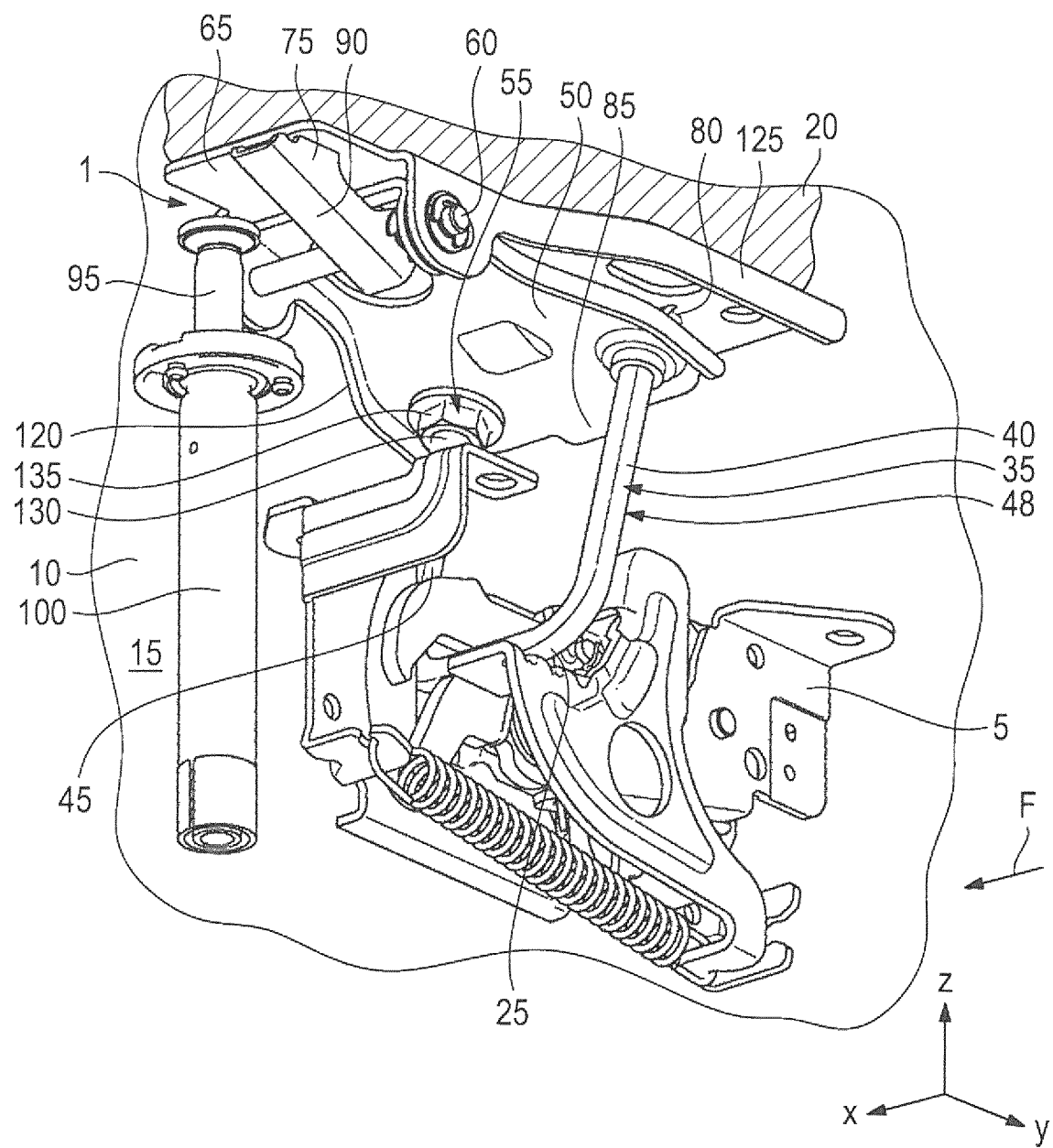

In FIG. 4B, the ram 95 has extended further and swivels the first releasing device 75 about the pivot shaft 60 in the z-direction until its top side comes to bear against the bottom of the engine hood fastening device. The shoulders 115 of the first releasing device 75 move from their starting position and are released from the first antirotation device 70. At the same time, the second releasing device 85 and the second antirotation device 80 are released. In this state as well, the closure bracket upper part 35 is substantially vertically oriented in the z-direction.

In the further raising process, the engine hood 20 is moved by the actuator-triggered engine hood hinge assembly, not shown here but known in itself and located in the region of the windshield (not shown) of the motor vehicle 15, contrary to the main driving direction F, i.e., contrary to the x-direction. Because of the previously described releasing of the first releasing device 75 from the first antirotation device 70 and the second releasing device 85 from the second antirotation device 80, this results in a detachment of the bearing surface 90 from the ram 95, a swiveling of the engine hood fastening device 65 about the pivot shaft 60, a swiveling of the closure bracket holder 50 about the pivot shaft 60 and a swiveling of the closure bracket 35 about the closure bolt 25, which is held in the lock 5. The closure bracket 35, the closure bracket holder 50 and the engine hood fastening device 65 thus perform a purely rotational movement. But since these elements are part of a kinematic chain formed by closure bolt 25, closure bracket upper part 35, closure bracket holder 50, pivot shaft 60 and engine hood fastening device 65, it is advantageously possible by appropriate dimensioning and positioning to define precisely the raising path of the engine hood 20 at the lock side, not only in rotational but also in translatory manner. Thus, for example, it is possible to raise the closure bracket assembly 1 after the triggering of the actuator 100 by a signal representing a collision, not shown, at first in the z-direction and only after this to move in the x-direction, in order to first gain space (height) between the bottom of the engine hood 20 and a subassembly located beneath it (not shown here), such as a drive engine of the motor vehicle 15, so that even smaller persons are effectively protected against impact on the hard subassembly.

Figure 4D:
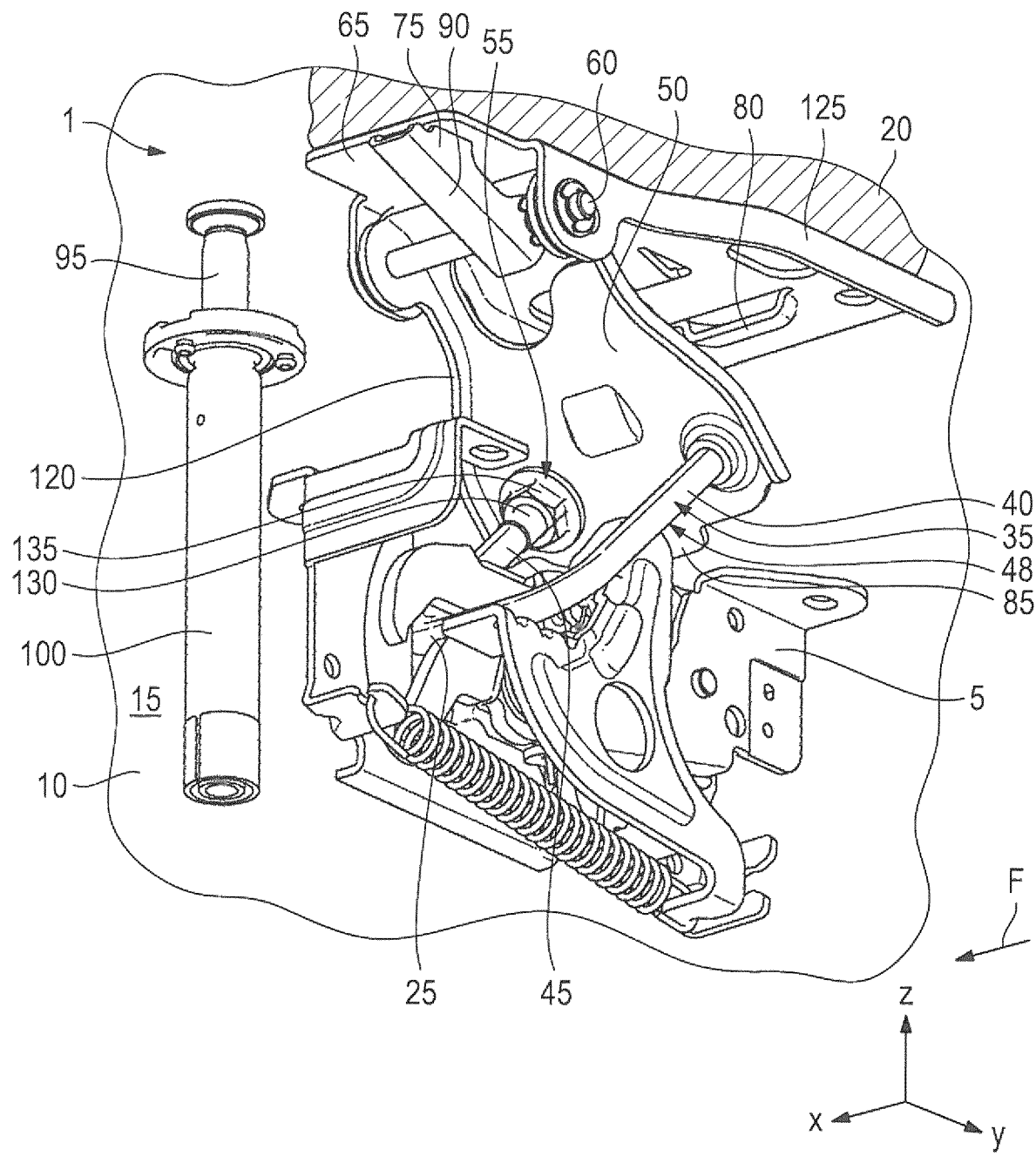

The above-described movement process is continued until the engine hood 20 is in the protective position. In this case, as shown in FIG. 4D, the closure bracket 35, the closure bracket holder 50 and the engine hood fastening device 65 themselves continue to move in purely rotational motion. Thus, the angle of inclination of the closure bracket 35 with respect to the x,y-plane in this sample embodiment is substantially 45°. Also in this state the closure bolt 25 remains in the lock 5, i.e., during the entire raising movement of the engine hood 20 as shown in FIG. 1 as well as FIGS. 4A to 4D it can rotate, but not shift either in the x-direction or the y-direction or z-direction. Due to the above described kinematic chain, the engine hood 20 would travel on the whole along a defined raising path composed of rotational and translatory movement.

The closure bracket assembly 1 according to the invention has an intrinsically reversible design. This means that after being raised on account of a typical collision, it can be returned to its starting position with no major expense and thus the engine hood 20 can be placed back in its normal position. Only when a pyrotechnical actuator 100 is used is it necessary to replace this after use—as is also known in the prior art.

LIST OF REFERENCE NUMBERS 1 closure bracket assembly
5 lock
10 car body
15 motor vehicle
20 engine hood (front flap)
25 closure bolt
35 closure bracket upper part
40 bracket
45 bracket
48 closure bracket
50 closure bracket holder
55 adjustment device
60 pivot shaft
65 engine hood fastening device
70 first antirotation device
75 first releasing device
80 second antirotation device
85 second releasing device
90 bearing surface
95 ram
100 actuator
105 recess
110 opening
115 shoulder
120 bevel
125 bevel
130 thread
135 screw
F main driving direction
x,y,z Cartesian vehicle-bound coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A closure bracket assembly for retaining or raising a pivotable engine hood of a motor vehicle from a normal position into a protection position, comprising:
    a closure bracket having a closure bolt and a closure bracket upper part, wherein the closure bolt is directly secured in a front engine hood lock located in a front area of the engine hood in the normal position and in the protection position;
    an engine hood fastening device that is securable on the engine hood;
    a pivot shaft which is arranged on the engine hood fastening device and about which the engine hood fastening device is pivotably mounted for raising purposes; and
    a closure bracket holder on which the closure bracket is held, wherein
        the pivot shaft is arranged on the closure bracket holder, and
        the closure bolt is pivotable in the front engine hood lock during raising.

2. The closure bracket assembly as claimed in claim 1, wherein
    a first antirotation device, cooperating with a first releasing device, is arranged on the engine hood fastening device, which secures the engine hood fastening device in the normal position and releases the engine hood fastening device to assume the protection position.

3. The closure bracket assembly as claimed in claim 2, wherein
    the first releasing device and the first antirotation device are joined together releasably by force locking, form fit and/or frictional locking.

4. The closure bracket assembly as claimed in claim 2, the first releasing device is a blocking pawl which in the normal position lies against the first antirotation device, designed as a spring.

5. The closure bracket assembly as claimed in claim 3, the first releasing device is a blocking pawl which in the normal position lies against the first antirotation device, designed as a spring.

6. The closure bracket assembly as claimed in claim 1, wherein
    a second antirotation device, cooperating with a second releasing device, is arranged on the engine hood fastening device, which secures the engine hood fastening device in the normal position and releases the engine hood fastening device to assume the protection position.

7. The closure bracket assembly as claimed in claim 2, wherein
    a second antirotation device, cooperating with a second releasing device, is arranged on the engine hood fastening device, which secures the engine hood fastening device in the normal position and releases the engine hood fastening device to assume the protection position.

8. The closure bracket assembly as claimed in claim 6, wherein
    the second releasing device and the second antirotation device are joined together releasably by force locking, form fit and/or frictional locking.

9. The closure bracket assembly as claimed in claim 7, wherein
    the second releasing device and the second antirotation device are joined together releasably by force locking, form fit and/or frictional locking.

10. The closure bracket assembly as claimed in claim 6, wherein
    the second releasing device is a spring which in the normal position engages the second antirotation device, designed as a groove.

11. The closure bracket assembly as claimed in claim 8, wherein
    the second releasing device is a spring which in the normal position engages the second antirotation device, designed as a groove.

12. The closure bracket assembly as claimed in claim 7, wherein
    the first releasing device and/or the second releasing device is activatable by an actuator.

13. The closure bracket assembly as claimed in claim 1, wherein
    the closure bracket holder is substantially congruent with the engine hood fastening device and/or is arranged in the latter in the normal position.

14. The closure bracket assembly as claimed in claim 1, wherein
    the closure bracket has at least one adjustment device.

15. A motor vehicle comprising:
    an engine hood which is raisable from a normal position into a protective position by way of a rear hinge mechanism;

the front engine hood lock arranged in the front area of the engine hood; and a closure bracket assembly as claimed in claim 1.

\* \* \* \* \*